United States Patent [19]

Harris, Jr.

[11] Patent Number: 4,568,481

[45] Date of Patent: Feb. 4, 1986

[54] EXTENSION OF GELATION TIME OF CROSSLINKED POLYGALACTOMANNANS

[75] Inventor: William F. Harris, Jr., Louisville, Ky.

[73] Assignee: Celanese Corporation, New York, N.Y.

[21] Appl. No.: 580,970

[22] Filed: Feb. 16, 1984

[51] Int. Cl.$^4$ .................... B01J 13/00; C06B 31/30; E21B 43/28

[52] U.S. Cl. .................... 252/315.3; 149/46; 149/60; 149/61; 166/271; 166/308; 252/8.55 R

[58] Field of Search ............ 252/8.55 R, 315.1, 315.3; 166/294, 271, 283, 308; 149/46, 60, 61

[56] References Cited

U.S. PATENT DOCUMENTS

| | | | |
|---|---|---|---|
| 3,202,556 | 8/1965 | Chrisp | 252/315.3 |
| 3,523,048 | 8/1970 | Hopler | 149/44 |
| 3,740,360 | 6/1973 | Nimerick | 523/131 |
| 3,794,115 | 2/1974 | Skagerberg | 166/294 |
| 3,940,297 | 2/1976 | Bolza | 149/60 |
| 4,021,355 | 5/1977 | Holtmyer | 252/8.55 R |
| 4,466,890 | 8/1984 | Briscoe | 252/8.55 R |
| 4,470,915 | 9/1984 | Conway | 252/8.55 R |
| 4,488,975 | 12/1984 | Almond | 252/8.55 R |
| 4,505,826 | 3/1985 | Horton | 252/8.55 R |

Primary Examiner—Dennis L. Albrecht
Attorney, Agent, or Firm—Herbert P. Price

[57] ABSTRACT

In a process for preparing crosslinked gels from aqueous polygalactomannans using potassium pyroantimonates, the rate of gel formation is decreased by chelating the potassium pyroantimonate with di or tri alkali metal or ammonium citrate.

9 Claims, No Drawings

EXTENSION OF GELATION TIME OF CROSSLINKED POLYGALACTOMANNANS

BACKGROUND OF THE INVENTION

The field of art to which this invention pertains is aqueous thickening and gelling agents.

The use of polygalactomannans as thickening agents for aqueous compositions and to crosslinking such compositions with potassium pyroantimonate and other crosslinking compounds is well known.

U.S. Pat. No. 3,794,115 describes a method for making plugs in boreholes using guar gums as the thickening agent and various crosslinking agents, such as borax glass, sodium and potassium pyroantimonate, antimony oxide and chromium salts. The crosslinking agents are said to have at least one characteristic which can delay the crosslinking action. This characteristic can be that the crosslinking agent is in a slowly soluble form. It can be that the crosslinking agent must react with another component of the dispersion before it has crosslinking capacity. The delaying characteristic may be that at certain pH values the crosslinking action of a particular crosslinking agent is very slow. Finally, the characteristic can be that the crosslinking agent is temperature dependent.

The crosslinking activity of pyroantimonate ions is pH sensitive and occurs in the range of about 3 to 7. At the pH range of 6 to 7, however, the crosslinking activity is very slow. Various acids, such as acetic, citric, oxalic, hydrochloric, sulfuric and nitric acids can be used to control the pH according to U.S. Pat. No. 3,794,115.

In U.S. Pat. No. 3,523,048, bulk delivery of aqueous slurry explosives containing gelling agents is described. Guar gum and potassium pyroantimonate are disclosed as being the preferred gel system. To control the rate of gelation, the pH of the composition is adjusted with various acids, such as fumaric acid, acetic acid, citric acid, nitric acid, sulfonic acid, hydrochloric acid and the like.

U.S. Pat. No. 4,021,355 describes fracturing fluids for oil wells. Potassium pyroantimonate is used to crosslink guar gum at a pH of 5 or below. Sodium dihydrogen citrate is added as an acid buffer to lower the pH of the system and to increase the rate of the crosslinking reaction.

SUMMARY OF THE INVENTION

This invention pertains to a process for forming thickened and gelled aqueous solutions. In particular, this invention relates to a process for forming aqueous solutions of polygalactomannans and to gelling such solutions at a controlled rate with alkali metal pyroantimonate. More particularly, this invention pertains to a process for chelating alkali metal pyroantimonate with a citrate salt, thereby retarding and controlling the rate of crosslinking between the polygalactomannan and the pyroantimonate.

In carrying out the process of crosslinking a colloidal solution or dispersion of a polygalactomannan in water with an alkali metal pyroantimonate to form a gel, the pyroantimonate is reacted with a di or tri alkali metal or ammonium citrate in an amount sufficient to chelate the pyroantimonate and to retard gelation of the polygalactomannan. In this process about 0.5 to about 10 moles of the citrate, preferably about 1 to about 8 moles, are used with each mole of the pyroantimonate.

In one aspect of this invention, the di or tri alkali metal or ammonium citrate is dry blended with the polygalactomannan. The dry blend is then dispersed in water followed by the addition of the alkali metal pyroantimonate. In this process, it is preferred to use about 3 to about 10 moles of citrate for each mole of the pyroantimonate and, most preferably, about 6 to about 8 moles.

In another aspect of this invention, the alkali metal pyroantimonate is reacted with a di or tri alkali metal or ammonium citrate in water to form a chelate. This chelate solution is then added to an aqueous dispersion of the polygalactomannan. In this process, it is preferred to use about 0.5 to about 3 moles of the citrate for each mole of the pyroantimonate and, most preferably, about 1 to about 2.5 moles.

DESCRIPTION OF THE INVENTION

The polygalactomannans useful in this invention are polysaccharides composed principally of galactose and mannose units and are usually found in the endosperm of leguminous seeds, such as guar, locust bean, honey locust, flame tree and the like.

Guar gum is composed mostly of a polygalactomannan which is essentially a straight chain of mannose units with single membered galactose branches. The mannose units are linked in a 1-4-$\beta$-glycosidic linkage and the galactose branching takes place by means of a 1-6 linkage of alternate mannose units.

Locust bean gum is a polygalactomannan of molecular structure similar to guar gum. In locust bean gum the ratio of galactose units to mannose units is one to four.

The preferred polygalactomannan for use in this invention is guar gum and its derivatives. Useful derivatives are hydroxyalkyl guar, e.g., hydroxyethyl or hydroxypropyl guar, carboxymethyl and carboxyethyl guar, phosphated guar, cationic guar, depolymerized guar, glyoxal treated guar and the like. Guar derivatives are well known in the art and are described in such patents as U.S. Pat. Nos. 2,477,544; 2,520,161; 3,205,125; 3,297,604; 3,350,386; 3,498,912; 3,723,409; 3,912,713; 4,028,127 and 4,320,226, which are hereby incorporated by reference.

The crosslinking agents useful in this invention are the alkali metal pyroantimonates, particularly sodium and potassium pyroantimonate. The alkali metal pyroantimonates and their use as crosslinking agents for guar gum solutions is well known. British Pat. No. 801,572 describes a method for preparing alkali metal pyroantimonates. U.S. Pat. No. 4,033,415 describes cross-linking of guar using potassium pyroantimonate. Both of these patents are incorporated by reference.

The chelating agents useful in this invention are di and tri alkali metal and ammonium citrates, such as disodium citrate, trisodium citrate, dipotassium citrate, tripotassium citrate, diammonium citrate and triammonium citrate.

In carrying out the process of this invention, the polygalactomannan is generally dispersed and dissolved in the aqueous solution in the amount of about 0.3 to about 3 weight percent based on the weight of the aqueous solution, preferably, about 0.4 to about 2 weight percent and, most preferably, about 0.8 to about 1.2 weight percent.

The crosslinking agent, i.e., the alkali metal pyronantimonate, is used in the amount of about 0.1 to about 10 weight percent based on the weight of polygalactomannan and, preferably, about 0.5 to about 4 weight percent.

The chelating agent, i.e., the citrate, is used in the amount of about 0.5 mole to about 10 moles per mole of the alkali metal pyroantimonate and, preferably, about 1 to about 8 moles.

In carrying out the process of this invention, the alkali metal pyronantimonate, the citrate salt and the polygalactomannan can be added to water or an aqueous solution which is to be gelled, either together or in any order. However, in one preferred method, the citrate salt and the polygalactomannan are first dry blended and then added to the aqueous solution followed by addition of the pyroantimonate. In another preferred method, the pyroantimonate is first chelated by the citrate. This chelate is then added to the aqueous solution after the polygalactomannan has been added.

In the process of this invention, the chelation of the antimony ($Sb^{+5}$) cation by the citrate ligand delays the crosslinking of the polygalactomannan in an aqueous medium, thus allowing it to hydrate. Ultimately, the citrate ligand is displaced by the cis hydroxyls on the polygalactomannan and gelation occurs.

The process of this invention is particularly useful in the preparation of slurry explosives and in the fracturing of oil wells, such as described in U.S. Pat. Nos. 3,890,171 and 4,033,415 respectively. The thickened liquid can be pumped in place before crosslinking and gelation occurs due to the delay in crosslinking caused by the chelation reaction.

The invention is described in detail in the following examples. Parts and percentages as used in the examples are parts and percentages by weight unless otherwise noted.

EXAMPLE 1

Solutions of water soluble potassium pyronantimonate and diammonium citrate were prepared by dissolving the components in water in the amounts listed below.

TABLE I

|  | Example No. | | | |
| --- | --- | --- | --- | --- |
|  | 1A (Control) | 1B | 1C | 1D |
| Components |  |  |  |  |
| Water | 85 | 80 | 75 | 70 |
| Potassium Pyroantimonate | 15 | 15 | 15 | 15 |
| Diammonium Citrate | 0 | 5 | 10 | 15 |
| Properties |  |  |  |  |
| Specific Gravity | 1.08 | 1.11 | 1.15 | 1.18 |
| pH | 10.5 | 7.5 | 6.6 | 6.0 |

Nitrate liquors were prepared by dispersing and dissolving sodium nitrate and ammonium nitrate in water. The liquors contained 20% sodium nitrate and 58.5% ammonium nitrate, said percentages being based on the total weight of the nitrate salts and the water.

To 1200 parts of the nitrate liquors, adjusted to 43° C., were added 11.2 parts of guar powder using high shear agitation. Agitation under high shear was continued for one minute. An aliquot of the pyroantimonate solution (1A) was added at a volume to provide 0.55% potassium pyroantimonate, the percentage being based on the weight of guar. Mixing was continued for 1 minute.

This procedure was repeated with each of the pyroantimonate solutions listed above.

Viscosities and/or gel strengths were measured at specified time intervals. Viscosities were determined at 43° C. using a Brookfield RV Viscometer at 20 RPM. Gel strengths were determined emperically by feeling and probing the gels. A rating of 1 (on a scale of 1–10) indicates a weak gel. A rating of 10 indicates a stiff gel. Viscosities and/or gel strengths at measured time intervals were as follows:

TABLE II

|  | Example No. | | | |
| --- | --- | --- | --- | --- |
| Time | 1A | 1B | 1C | 1D |
| 3 Minutes | 3,400 cps | 3,200 cps | 2,900 cps | 3,050 cps |
| 7 Minutes | 7,400 cps | 7,600 cps | 6,950 cps | 6,900 cps |
| 1 Hour | 23,000 cps | 14,750 cps | 12,250 cps | 11,750 cps |
| 2 Hours | Gel - 2 | 27,000 cps | 16,500 cps | 16,000 cps |
| 3 Hours | — | Gel - 2 | 23,500 cps | 18,000 cps |
| 4 Hours | — | — | Gel - 2 | 20,750 cps |
| 24 Hours | Gel - 6 | Gel - 6 | Gel - 5 | Gel - 4 |
| 48 Hours | Gel - 6 | Gel - 6 | Gel - 6 | Gel - 6 |

EXAMPLE 2

Dry blends of trisodium citrate and guar powder were prepared in the following proportions:

TABLE III

|  | Example No. | | | |
| --- | --- | --- | --- | --- |
| Components | 2A (Control) | 2B | 2C | 2D |
| Trisodium Citrate | 0 | 5 | 10 | 15 |
| Guar | 100 | 95 | 90 | 85 |

Nitrate liquors were prepared in the same manner using the same components in the same amounts as described in Example 1.

Each blend (2A through 2D) was added to a separate portion of the nitrate liquors in the amount of 1% of the gum blend based on the weight of the nitrate liquor. The additions were made at 43° C. under high shear agitation. One minute after the addition of the blend, a solution of crosslinker (13% potassium pyroantimonate, 40% ethylene glycol, 47% water) was added in an amount sufficient to provide 0.55% potassium pyroantimonate based on the weight of the guar blend. Agitation was continued for 1 minute.

Viscosities and/or gel strengths were measured at 43° C. using a Brookfield RV Viscometer at 20 RPM.

TABLE IV

|  | Example No. | | | |
| --- | --- | --- | --- | --- |
| Time | 2A | 2B | 2C | 2D |
| 3 Minutes | 3,400 cps | 2,800 cps | 2,400 cps | 2,000 cps |
| 4 Minutes | 4,500 cps | 3,900 cps | 3,200 cps | 2,800 cps |
| 5 Minutes | 5,500 cps | 4,575 cps | 3,900 cps | 3,150 cps |
| 6 Minutes | 6,600 cps | 5,900 cps | 4,680 cps | 4,000 cps |
| 7 Minutes | 7,400 cps | 6,600 cps | 5,800 cps | 5,100 cps |
| 1 Hour | 23,000 cps | 16,000 cps | 14,400 cps | 10,800 cps |
| 2 Hours | Gel - 1 | 21,250 cps | 18,500 cps | 15,000 cps |
| 3 Hours | — | Gel - 2 | 29,000 cps | 18,750 cps |
| 4 Hours | — | Gel - 4 | Gel - 2 | 22,000 cps |
| 24 Hours | Gel - 6 | Gel -6 | Gel - 6 | Gel - 5 |

EXAMPLE 3

Dry blends of trisodium citrate and hydroxypropyl guar were made in the following proportions:

TABLE V

|  | Example No. | | |
| --- | --- | --- | --- |
| Components | 3A (Control) | 3B | 3C |
| Trisodium Citrate | 0 | 5 | 10 |

TABLE V-continued

| | Example No. | | |
|---|---|---|---|
| Components | 3A (Control) | 3B | 3C |
| Hydroxypropyl Guar | 100 | 95 | 90 |

Using the same procedure described in Example 2, the dry blends, 3A-3C, were used with the nitrate liquors. The resulting viscosities and gel strengths of the products were as follows:

TABLE VI

| | Example No. | | |
|---|---|---|---|
| Time | 3A | 3B | 3C |
| 3 Minutes | 3,150 cps | 2,850 cps | 2,400 cps |
| 10 Minutes | 8,120 cps | 7,975 cps | 6,000 cps |
| 1 Hour | Gel - 1 | 17,350 cps | 9,550 cps |
| 2 Hours | Gel - 4 | Gel - 1 | 13,750 cps |
| 4 Hours | — | Gel - 4 | Gel - 2 |
| 24 Hours | Gel - 5 | Gel - 5 | Gel - 5 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a process for crosslinking a colloidal solution or dispersion of a polygalactomannan in water with an alkali metal pyroantimonate to form a gel, the improvement which comprises reacting the pyroantimonate with a di or tri alkali metal or ammonium citrate in an amount sufficient to chelate the pyroantimonate and to retard gelation of the polygalactomannan.

2. The process of claim 1 wherein about 0.5 to about 10 moles of citrate are present for each mole of pyroantimonate.

3. The process of claim 2 wherein about 1 to about 8 moles of citrate are present for each mole of pyroantimonate.

4. The process of claim 1 wherein the polygalactomannan is guar gum.

5. The process of claim 1 wherein the polygalactomannan is a guar gum derivative.

6. The process of claim 1 wherein the citrate is dry blended with the polygalactomannan, the blend is dispersed in water and the pyroantimonate is added in such an amount that about 3 moles to about 10 moles of citrate are present for each mole of pyroantimonate.

7. The process of claim 6 wherein about 6 to about 8 moles of citrate are present for each mole of pyroantimonate.

8. The process of claim 1 wherein the polygalactomannan is dispersed in water followed by the addition of an aqueous solution of a chelate of the pyroantimonate and the citrate wherein about 0.5 to about 3 moles of citrate are present for each mole of pyroantimonate.

9. The process of claim 8 wherein about 1 to about 2.5 moles of citrate are present for each mole of pyroantimonate.

* * * * *